(12) United States Patent
Axer et al.

(10) Patent No.: US 12,476,887 B2
(45) Date of Patent: Nov. 18, 2025

(54) APPARATUS INCLUDING A TRANSCEIVER

(71) Applicant: NXP B.V., Eindhoven (NL)

(72) Inventors: Philip Axer, Hamburg (DE); Christian Herber, Hamburg (DE)

(73) Assignee: NXP B.V., Eindhoven (NL)

( * ) Notice: Subject to any disclaimer, the term of this patent is extended or adjusted under 35 U.S.C. 154(b) by 352 days.

(21) Appl. No.: 18/180,552

(22) Filed: Mar. 8, 2023

(65) Prior Publication Data

US 2023/0291664 A1    Sep. 14, 2023

(30) Foreign Application Priority Data

Mar. 9, 2022    (EP) .................................... 22161144

(51) Int. Cl.
*H04L 43/028*    (2022.01)
*H04L 43/18*    (2022.01)

(52) U.S. Cl.
CPC ............ *H04L 43/028* (2013.01); *H04L 43/18* (2013.01)

(58) Field of Classification Search
CPC .............................. H04L 43/028; H04L 43/18
See application file for complete search history.

(56) References Cited

U.S. PATENT DOCUMENTS

| | | | |
|---|---|---|---|
| 7,706,363 B1 | 4/2010 | Daniel et al. | |
| 2008/0123652 A1* | 5/2008 | Akyol | H04L 12/465 370/392 |
| 2013/0117856 A1 | 5/2013 | Branscomb | |
| 2020/0145469 A1* | 5/2020 | Kashiwazaki | G06F 13/00 |
| 2023/0208818 A1* | 6/2023 | Cavaliere | H04L 63/18 726/26 |
| 2024/0007367 A1* | 1/2024 | Demchenko | H04L 47/245 |

OTHER PUBLICATIONS

Lackorzynski et al., "Enabling and Optmiizing MACsec for Industrial Environments", IEEE Transactions on Industrial Informatics, vol. 17, No. 11, Nov. 2021, IEEE Publishing.*
Papadopoulos et al., "A Name-Based Secure Communications Architecture for Vehicular Networks", 2021 IEEE Vehicular Networking Conference, Nov. 10, 2021, IEEE Publishing.*
IEEE 802.3x Standards for Ethernet—Annex 31B; IEEE Standards Association; 12 pages; Jun. 14, 2018.
(Continued)

*Primary Examiner* — Todd L Barker

(57) ABSTRACT

An apparatus comprising: an input for receiving a stream of data transmission units; a filter configured to identify data transmission units of a first predetermined type based on predefined identifying information and generate a second stream of data transmission units comprising said first stream with at least one data transmission unit filtered out; a protocol module configured to identify, based on second predefined identifying information, and in said second stream at least one data transmission unit of a second predetermined type and add protocol information thereto; and wherein the filter being configured to filter out said at least one data transmission unit provides time in said second stream for the addition of the protocol information; and wherein the apparatus includes a transceiver configured to output signals representative of said data transmission units of the second stream with said protocol information added to a transmission medium.

17 Claims, 2 Drawing Sheets

(56) References Cited

OTHER PUBLICATIONS

Cisco; "Configuring Protocol Filtering"; retrieved from the Internet https://www.cisco.com/c/en/us/td/docs/switches/lan/catalyst4000/8-2glx/configuration/guide/protfilt.html; 3 pages; May 6, 2007.
IEEE 802.1 Qbb; "IEEE Standard for Local and metropolitan area networks—Media Access Control (MAC) Bridges and Virtual Bridged Local Area Networks—Amendment 17: Priority-based Flow Control"; IEEE Standards Association; 40 pages; Sep. 30, 2011.
Jimenez, Julio; "Configure and Filter IP Access List"; Cisco Troubleshooting TechNotes; retrieved from the Internet https://www.cisco.com/c/en/us/support/docs/security/ios-firewall/23602-confaccesslists.html; 14 pages; Oct. 7, 2022.
Wikipedia; "Access Control List"; retrieved from the Internet https://en.wikipedia.org/wiki/Access-control_list#Networking_ACLs; 3 pages; Jan. 2, 2023.

\* cited by examiner

APPARATUS INCLUDING A TRANSCEIVER

CROSS-REFERENCE TO RELATED APPLICATIONS

This application claims the priority under 35 U.S.C. § 119 of European patent application no. 22161144.5, filed on 9 Mar. 2022 the contents of which are incorporated by reference herein.

FIELD

The present disclosure relates to an apparatus including a transceiver. In particular, the disclosure relates to an apparatus configured to remove one or more data transmission units to make way for protocol information.

BACKGROUND

Transceivers, which are typically part of physical layer, PHY, modules may be provided in an apparatus along with modules that provide other functionality. The other functionality may comprise security functionality, such as the provision of data confidentiality or data integrity functions.

SUMMARY

According to a first aspect of the present disclosure there is provided an apparatus comprising:
  an input for receiving a stream comprising a plurality of data transmission units;
  a filter configured to identify, in the stream, at least one data transmission unit of a first predetermined type based on predefined identifying information and generate a second stream of data transmission units comprising said first stream with at least one data transmission unit filtered out, the at least one data transmission unit that is filtered out comprising one of: the identified data transmission unit of the first predetermined type; and at least one data transmission unit that is received subsequent to the data transmission unit of the first predetermined type;
  a protocol module configured to receive said second stream and identify, in the second stream, at least one data transmission unit of a second predetermined type and add protocol information to the at least one data transmission unit of the second predetermined type, the protocol module configured to identify the at least one data transmission unit of the second predetermined type based on second predefined identifying information; and
  wherein the filter being configured to filter out said at least one data transmission unit provides time in said second stream for the addition of the protocol information prior to a start of a subsequent data transmission unit in said second stream; and
  wherein the apparatus includes a transceiver configured to output signals representative of said data transmission units of the second stream with said protocol information added to a transmission medium.

In one or more embodiments, the filter is configured to identify, in the stream, the at least one data transmission unit of the first predetermined type based on an address stated in said at least one data transmission unit matching one of one or more predetermined addresses in said predefined identifying information.

In one or more embodiments, the predetermined address comprises a destination media access control, MAC, address.

In one or more examples, the filter is configured to identify, in the stream, the at least one data transmission unit of the first predetermined type based on one or more of:
  a) a destination address;
  b) a source address;
  c) an EtherType field; and
  d) a VLAN, Virtual Local Area Network, identifier;
  e) a preamble pattern; matching said predefined identifying information; or
  f) a filtering rule indicative of one or more data transmission units in consecutive groups of data transmission units.

In one or more embodiments, the second stream of data transmission units comprises said first stream with said at least one data transmission unit of the first predetermined type filtered out.

In one or more embodiments, the size of the one or more data transmission units of the first predetermined type are at least the size of the protocol information added by the protocol module.

In one or more embodiments, said protocol module comprises a security protocol module and said protocol information added to the data transmission unit of the second predetermined type comprises security protocol information.

In one or more embodiments, said protocol module is configured to implement, at least in part, the MACSec security protocol, and wherein the security protocol information includes at least one of a MACSec header and Integrity Check Value.

It will be appreciated that the security module may be configured to add further data to the data transmission unit in accordance with the MACSec security protocol, such as an ICV field in addition to the header.

In one or more embodiments, the filter is configured to filter said at least one data transmission unit at least at times when the space between the data transmission unit of the second predetermined type and a directly subsequent data transmission unit in the stream is less than that required to add the protocol information.

In one or more examples, said stream comprises said data transmission units each having a time gap therebetween that is less than that required to add the protocol information at a data rate corresponding to a data rate used to encode the data transmission units.

In one or more embodiments, the apparatus is configured to receive the stream at predetermined line rate and the transceiver is configured to transmit said signals at the output at the predetermined line rate.

According to a further aspect of the disclosure we provide an apparatus of the first aspect in combination with a processor, wherein:
  the processor is configured to generate a plurality of said data transmission units for the stream, wherein the processor is configured to generate, for each of the data transmission units of the second predetermined type, at least one data transmission unit of the first predetermined type that directly follows said data transmission unit of the second predetermined type for filtering out by the filter;
  wherein the controller is configured to provide said plurality of said data transmission units to a media access controller for adding information to said data transmission units before providing the stream of data transmission units for the apparatus.

In one or more embodiments, the media access controller is configured to receive said plurality of said data transmission units from the controller and provide adds to said data transmission units at least one of: a preamble, a start-of-frame delimiter, a frame check sequence and at least a predetermined time-space between each data transmission unit.

In one or more examples, the apparatus may be provided in combination with said processor and said media access controller.

In one or more embodiments, said first predetermined type is the same as said second predetermined type and wherein the second stream of data transmission units comprises said first stream with one or more data transmission units that appear in said stream directly after said data transmission unit of the first predetermined type filtered out.

In one or more embodiments, the apparatus comprises an integrated circuit including said transceiver module, and the processor comprises a processor configured to control a media access controller that provides the stream to the apparatus.

According to a second aspect of the disclosure we provide a method comprising:
receiving, by an apparatus, a stream of data transmission units;
identifying in the stream, by a filter, at least one data transmission unit of a first predetermined type based on predefined identifying information and generating a second stream of data transmission units comprising said first stream with at least one data transmission unit filtered out, the at least one data transmission unit that is filtered out comprising one of: the identified data transmission unit of the first predetermined type; and at least one data transmission unit that is received subsequent to the data transmission unit of the first predetermined type;
receiving, at a protocol module, said second stream and identifying, in the second stream, at least one data transmission unit of a second predetermined type and adding protocol information to the at least one data transmission unit of the second predetermined type, the protocol module configured to identify the at least one data transmission unit of the second predetermined type based on second predefined identifying information; and
wherein the filtering out of said at least one data transmission unit is configured to provide time in said second stream for the adding of the protocol information prior to a start of a subsequent data transmission unit in said second stream; and
transmitting signals representative of said data transmission units of the second stream with said protocol information added over a transmission medium.

In one or more embodiments, the method includes, prior to said receiving by the apparatus:
generating, by a processor, a plurality of said data transmission units for the stream, wherein for each of the data transmission units of the second predetermined type, the method comprises generating at least one data transmission unit of the first predetermined type to directly follow said data transmission units of the second predetermined type for filtering out by the filter;

providing, by said processor, said plurality of said data transmission units to a media access controller that provides the stream of data transmission units to the apparatus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A transceiver is configured to transmit signals over a transmission medium and, in one or more examples, receive signals from the transmission medium. It will be known to those skilled in the art that a transceiver may be part of a physical layer module or PHY. The PHY module may be provided as an integrated circuit and may provide an interface between "other devices" and the transmission medium. The PHY module may implement physical layer functions with reference to the known OSI model, and as such may be configured to generate signals, based on the data transmission units it receives, according to a protocol, the signals having one or more of an appropriate rate, voltage, and line code. The "other devices" may implement data link layer functions or higher level functions of the OSI model. The transmission medium may comprise a cable, an optical fibre or air in the case of wireless transmission.

In some examples, the transceiver or PHY module may be part of an apparatus, such as an integrated circuit, that also provides for, at least in part, other protocol functions. The other protocol functions may include security protocol based functions, such as data confidentiality and data integrity or non-security related functions. In one or more examples, it may be challenging to implement the other protocol functions due to limitations in the functionality of one or more components of the apparatus and/or the functionality of the other devices configured to provide data to the apparatus and/or limitations in control signals that may be provided to the apparatus and/or due to rules any one or more of the apparatus or other devices are expected to implement.

Figure 1:
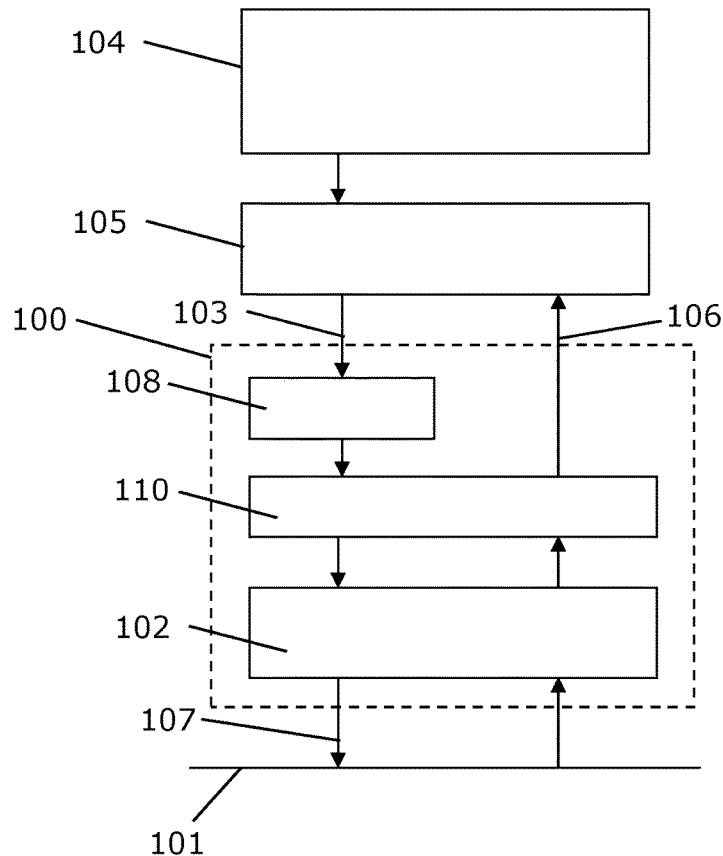
FIG. 1 shows an example embodiment of an apparatus according to the disclosure as well as a processor and media access controller.

FIG. 1 shows an example apparatus 100 according to the disclosure. The apparatus 100 may comprise an integrated circuit and may be configured to be coupled to a transmission medium 101 (shown generally as a line but could comprise an antenna-air interface). The apparatus 100 may be considered a transceiver and, accordingly, may include a PHY module 102 that provides the physical layer functionality. The apparatus 100 may be configured to receive data at input 103 from a processor 104 and a controller 105 and provide for transmission of signals over the transmission medium 101 based on said data. In other examples, the controller 105 is not present and the apparatus receives data from the processor 104. In one or more examples, the apparatus 100 may be configured to receive signals from the transmission medium and provide data based on said signals to the controller 105 and/or processor 104 at a receive output 106.

In one or more examples described herein, the apparatus 100 and processor 104 described may implement Ethernet protocols. The controller 105 may comprise a Media Access Controller or "MAC". Some Ethernet protocols, such as Ethernet security protocols, may be implemented, at least in part, by the apparatus 100 that includes the PHY module 102.

MACsec comprises an example of an Ethernet security protocol or standard. IEEE 802.1AE defines MACsec which comprises a network security standard that operates at a medium access control layer. As will be known to those skilled in the art, MACsec may define connectionless data confidentiality and integrity rules and processes for media access independent protocols. It will be appreciated however that other protocols, whether security related or not, may be implemented at least in part, or in full, by the apparatus 100.

The apparatus 100 comprises the input 103 for receiving a stream of data transmission units, such as frames or packets, from the processor 104 and via the MAC 105. The media access controller 105 may be configured to receive said plurality of said data transmission units from the controller 104 and provide for addition, to said data transmission units, of one or more of: a preamble, a start-of-frame delimiter, a frame check sequence (such as a Cyclic Redundancy Check code) and at least a predetermined time-space between each data transmission unit, sometimes known as an inter-packet gap or inter frame space. The typical processing performed by a MAC will be familiar to those skilled in the art.

The input 103, due to its coupling to the MAC 105, may comprise a media independent interface, known in the art as xMII. In general, the apparatus 100 and, more specifically, the PHY module 102 provides for physical layer processing of the stream of data transmission units and provides for transmission, at an output 107, of signals that represent the stream of data transmission units on or to the transmission medium 101. The output 107 may comprise a media dependent interface, known as MDI, of the PHY module 102 of the apparatus 100.

In many implementations of Ethernet, the apparatus 100 or at least the PHY module 102 thereof, may be configured to receive data at a line rate speed and transmit the signals to the transmission medium at the same line rate speed. Accordingly, the apparatus 100 may be configured to perform its processing on-the-fly at line rate speed. In some examples, the fundamental implication of this is that the PHY module 102 cannot increase the size of a data transmission unit or frame that enters the xMII 103 and is destined to the MDI 107. However, the implementation of protocols in the apparatus 100 typically requires data, such as headers and other (e.g. security) information to be added to data transmission units passing through the apparatus 100. Thus, it is a challenge to find enough time spacing between consecutive frames to add the information required to implement the protocols, such as security protocols in the apparatus 100.

In the present example embodiment, the apparatus 100 includes a filter 108. The filter 108 is configured to filter out, i.e. remove or disregard, particular data transmission units from the stream of data transmission units received at the input 103. Thus, the filter 108 is configured to identify, in the stream, at least one data transmission unit of a first predetermined type based on predefined identifying information. Thus, the filter 108 may be configured to allow data transmission units to pass through however upon identification of a data transmission unit of the first predetermined type, its filtering action is activated.

The filter 108 may be configured to identify, in the stream, the at least one data transmission unit of the first predetermined type based on an address appearing in the data transmission unit. The filter 108 may use a look-up table or similar containing predefined identifying information comprising one or more predetermined addresses. Accordingly, the filter 108 may be configured to determine if each of the data transmission units has an address that appears in the predefined identifying information. If one of the data transmission units has an address that appears in the predefined identifying information then it is determined to be of the first predetermined type and the filtering action is activated. If not, the filter module 108 may take no action. Accordingly, data transmission units that are not of the first predetermined type may be forwarded for transmission by the PHY module 102.

In one or more examples, the one or more predefined addresses may comprise destination media access control, MAC, addresses. However, in other examples, the addresses may be source MAC addresses or any other address type. It will be appreciated that one or more of the following data fields may be used to identify data transmission unit of the first predetermined type:

a) address including MAC address indicative of source or destination;
b) EtherType; and
c) VID, comprising a VLAN identifier.

In one or more examples, the predefined identifying information may comprise a rule indicative of which data transmission units to filter relative to the data transmission units received. For example, the rule may indicate every second data transmission unit, or one data transmission unit in each group of N data transmission units. Accordingly, the rule may be used to identify the data transmission units of first predetermined type.

The filter 108, by filtering out certain data transmission units, generates a second stream of data transmission units comprising said first stream with at least one data transmission unit filtered out.

The filter 108 may be configured in different ways to filter out different data transmission units. For example, in a first example, the at least one data transmission unit that is filtered out comprises the identified data transmission unit of the first predetermined type. Accordingly, the filter 108 is configured to identify the data transmission units of the first predetermined type and remove them from the stream to generate the second stream.

In a second example, the at least one data transmission unit that is filtered out by the filter 108 comprises at least one data transmission unit that is received subsequent to the data transmission unit of the first predetermined type.

Accordingly, the filter 108 is configured to identify the data transmission units of the first predetermined type and then remove at least one data transmission unit that is received directly after the data transmission unit of the first predetermined type in the stream to generate the second stream.

Figure 2:
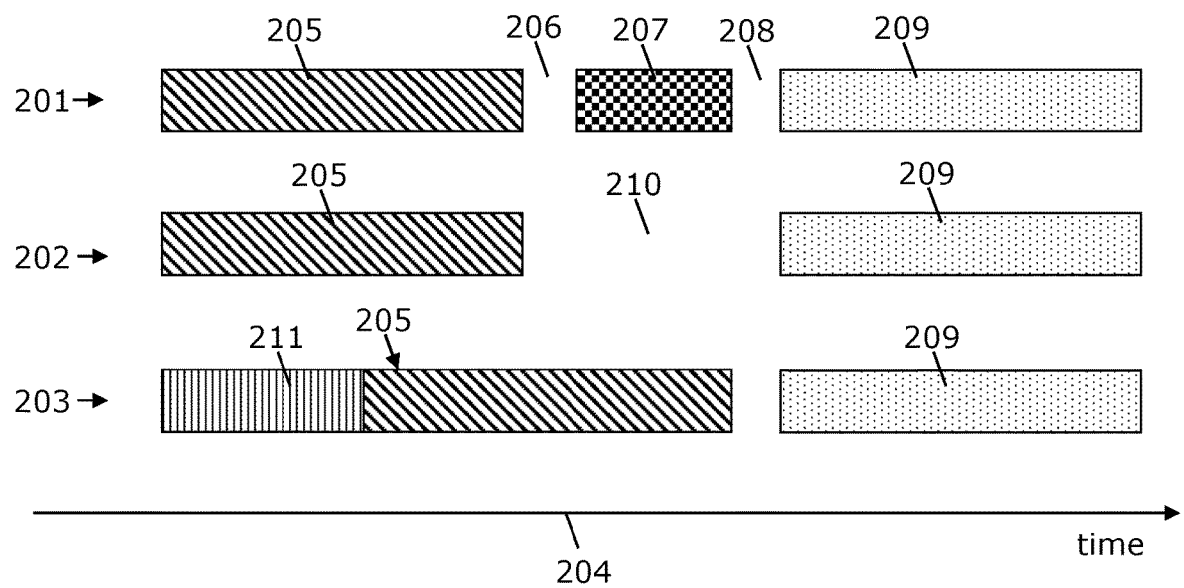
FIG. 2 shows an example data flow diagram illustrating an example stream of data transmission units at different points in said apparatus of FIG. 1.

FIG. 2 provides an example of the filtering action of the filter 108. FIG. 2 shows three streams of data transmission units 201, 202, 203 presented along a time axis 204. The first stream 201 shows the stream of data transmission units received by the apparatus 100 from input 103. The second stream 202 shows an example of the second stream generated by the filter 108 by way of its filtering action of the stream 201. The third stream 203 will be described later.

Thus, the first stream 201 comprises a first data transmission unit 205, a time space 206 comprising an inter-packet gap (IPG), followed by a subsequently received second data transmission unit 207, a further time space 208 followed by a subsequently received third data transmission unit 209. It will be appreciated that the minimum size of the time gaps 206 and 208 may be specified by a protocol.

Thus, when the data rate of the stream 201 is high, such as at a maximum data rate, the IPGs may be at their minimum time spacing. This leaves no bit time available for addition of any further data to the data transmission units, such as protocol information described later. Even when the data rate is not at a maximum and the interpacket gaps 206, 208 are not at their minimum time spacing, there may be insufficient bit time available for addition of protocol data if that protocol data itself has a minimum size. In other examples, there may be insufficient bit time available for addition of additional data transmission units to the stream 201 by the apparatus 100.

In this example the first data transmission unit 205 is not of the first predetermined type, the second data transmission unit 207 is of the first predetermined type and the third data transmission unit 205 is not of the first predetermined type.

Accordingly, in this example, the filter module 108 removes from the stream 201 the second data transmission unit 207 because it is of the first predetermined type and allows the first and third data transmission units 205, 209 to pass through. Thus, the second stream 202 comprises only the first and third data transmission units 205, 209 with a large IPG 210 provided by the sum of the IPG 206, the second data transmission unit 207 (now filtered out) and the IPG 208. Accordingly, the second stream 202 now includes time to add protocol information in the IPG 210. Thus, the size of the one or more data transmission units of the first predetermined type that are filtered out may be at least the size required to provide enough time for the protocol module 110 to add the protocol information.

The apparatus 100 further comprises a protocol module 110 configured to receive said second stream 202. The protocol module 111 is configured to add protocol information to selected data transmission units of the second stream 202. It will be appreciated that this is made possible by the removal of the second data transmission unit 207 that makes way for said protocol information.

Thus, the protocol module 110 is configured to identify, in the second stream, at least one data transmission unit of a second predetermined type.

The data transmission units of the second predetermined type (i.e. first data transmission unit 205 in FIG. 2), in this example, comprise those designated for MACsec processing. Thus, the protocol module 110, in this example, may be considered to be a security protocol module 110 because it provides a data security function in terms of one or more of authentication of the sender or integrity of data contained within the data transmission unit. In particular, the protocol information it may be configured to add provides for verification on the authenticity of data and/or the sender. However, it will be appreciated that the processing and/or protocol information added by the protocol module 110 may be information other that MACsec processing-derived information.

The protocol module 110 may be configured to determine that the data transmission unit is of the second predetermined type by reading a MAC address (e.g. destination or source MAC address) from the data transmission unit and making reference to a look-up table of second predefined identifying information. If the MAC address is found, this may indicate to the protocol module 110 that data transmission unit should be subject to MACsec processing (or other processing/addition of information in other examples). Alternatively, the protocol module 110 may be configured to determine that the data transmission units are of the predetermined type by reading a VLAN field and making reference to second predefined identifying information that specifies the VLAN values that should be subject to MACsec processing. The look-up table, second predefined identifying information or more generally a memory, may be configured by the processor 104 to allow the protocol module 111 to identify data transmission units that require the addition of protocol information and, in this example, MACsec processing. It will be appreciated that depending on the function of the protocol module 110 and thereby the protocol information to add to the data transmission units, the fields or rules used for identifying whether the data transmission unit is of the second predetermined type may vary. Thus, in other examples, different fields or rules may be used and the second predefined identifying information may be configured accordingly.

In this example and one or more other examples, the data transmission units of the second predetermined type that the protocol module 110 is looking for are those that precede the data transmission units of the first predetermined type that have been identified and filtered out by the filter module 108. However, in an alternate example, the filter module 108 and the protocol module 110 may be configured to identify data transmission units of the same type. That is, the first predetermined type is equivalent to the second predetermined type. In such an alternate embodiment, the filter module 108 is configured to identify data transmission units of the second predetermined type (i.e. those that are for processing by the protocol module 110). The filter module 108 may then be configured to filter out one or more subsequently received data transmission units. Thus, with reference to FIG. 2, the first data transmission unit 205 would be identified by the filter module 108 and it would be configured to filter out the subsequently received data transmission unit, that is the second data transmission unit 207.

The protocol module 110, for data transmission units that are identified as being of the second predetermined type, is configured to add protocol information 211. The protocol information 211 may comprise information determined from MACsec processing. Thus, the protocol information 211 may comprise a MACsec header, which may include a secure channel identifier and a packet number among other fields; and an Integrity Check Value (ICV) for the data transmission unit. The protocol module 110 may optionally encrypt the frame as per the MACSec 802.1AE standard and include the corresponding information.

With reference to FIG. 2, the third stream 203 shows the output of the protocol module 110 to the PHY module 102. The first data transmission unit 205 now includes the protocol information 211 added by the protocol module 111. It will be appreciated that although the protocol information 211 is shown as a contiguous field at the start of the first data transmission unit 205, it need not be. For example, the protocol information 211 may comprise one or more data items, which may be distributed over the data transmission unit, added to the first data transmission unit 205.

Thus, the apparatus 100 and, in particular, the filter 108 being configured to filter out said at least one data transmission unit provides time, that is bit time at the predetermined bit rate, in said second stream 202 for the addition of the protocol information 211 prior to a start of a subsequent data transmission unit (i.e. the third data transmission unit 209) in said second stream 203.

In this embodiment, the second data transmission unit 207, which is of the first predetermined type has a minimum size greater than or equal to the size of the corresponding protocol information 211 added by the protocol module 110. Thus, for one or more examples, the size of the protocol information 211 to be added by the protocol module 110 is known. For example, in implementations of the MACsec protocol, the protocol information comprises 32 bytes. Thus, the second data transmission unit 207 may also be of 32 bytes to provide the required bit time. This means that the space between two frames offered by the MAC 105 must be 12+32 bytes (IPG+MACSec headroom) in some examples.

With reference also to FIG. 1, the third stream 203 is provided to the transceiver, i.e. the PHY module 102 in this example. The PHY module 102 is configured to output signals, to the transmission medium 101, representative of said data transmission units of the third stream 203, which is equivalent to the second stream 202 with said protocol information 211 added.

Providing for additional bit time by the filtering of "dummy" or "sacrificial" data transmission units i.e. those of the first predetermined type in the present example, may be advantageous, particularly for the implementation of protocols that require the addition of information to the data transmission units in the apparatus 100. Addition of information in the apparatus 100 that includes the transceiver 102 may be difficult because communication between the apparatus 100 and devices that implement higher layer protocols may be limited. When the time between data transmission units 205, 207, 209 is small, there may not be enough bit time to add information.

In one or more examples, the processor 104 is configured to generate the plurality of said data transmission units or data from which the plurality of data transmission units can be generated. The processor 104 may determine which data transmission units 205 are to have the protocol information added by the apparatus 100. Accordingly, the processor 104 is configured to generate, for each of the data transmission units 205 of the second predetermined type, at least one data transmission unit of the first predetermined type 207 for removal by the filter. In this way, the processor 104 can provide the apparatus 100 with sacrificial data transmission units that can be removed to make way for said protocol information. The processor 104 may be configured to provide said at least one data transmission unit of the first predetermined type such that it directly follows said data transmission unit of the second predetermined type for filtering out by the filter.

In one or more examples, the processor 104 is configured to provide said plurality of said data transmission units or data to generate them to the media access controller 105 for adding MAC information to said data transmission units before providing the stream of data transmission units for the apparatus 100.

Thus, the apparatus 100 and the processor 104 may be configured to operate together to guarantee enough bit time in the stream provided to the apparatus 100 such that the protocol information generated by the MACsec protocol (or other protocol module 110) can be added. As such, in one or more examples, the apparatus 100 may be provided in combination with said processor 104 and said media access controller 105.

In one or more examples, the apparatus 100 receives signals from the transmission medium 101. The signals may be received by the PHY module 102 for decoding and then data transmission units derived therefrom are forwarded to the protocol module 110. In implementations where the protocol module implements MACsec, the MACsec information in the data transmission units is processed prior to sending to the MAC 105 via receive output 106.

The apparatus 100 may comprise an integrated circuit including said transceiver module 102, filter module 108, and protocol module 110. The apparatus 100 may be provided in combination with an appropriately configured processor 104 and, optionally, a MAC 105. However, the apparatus 100 may alternatively be coupled with a legacy processor 104 and/or legacy MAC 105. In such an example, the apparatus 100 may be provided in combination with computer program code for execution by the processor 104 as a firmware or software update to cause it to provide the sacrificial data transmission units for removal by the apparatus 100 as described herein.

In the example of FIG. 2, the protocol information 211 comprises a MACsec header (also known in the art as SecTag), which is an example of a security protocol header. The protocol information 211 may also comprises an Integrity Check Value, which is an example of security protocol information. The ICV may be calculated based on a data portion of the data transmission unit 205.

The present example may be advantageous because the provision of, and subsequent filtering of, sacrificial data transmission units provides for flow control. Thus, apparatuses that include a PHY module 102 and which implement MACSec have no intrinsic mechanism to throttle the incoming data. This is usually the case the full-duplex Ethernet PHYs, e.g. 100BASE-T1 or 1000BASE-T1 (as well as others) which are connected by an xMII interface to the MAC. As explained herein, the throttling is necessary to have enough time to add the protocol information, e.g. MACSec header and other protocol information to the frame. It also may overcome disadvantages associated with attempting to signal increases to the IPG to the MAC 105 or by the use of PAUSE flow-control.

The present examples may have advantages when said stream 201 comprises said data transmission units each having a time gap therebetween that is less than that required to add the protocol information 211 at a data rate corresponding to a data rate used to encode the data transmission units 205, 209. In some examples, the apparatus 100 and processor 104 may be configured to selectively operate as described (by providing the data transmission unit of first predetermined type 207 and subsequent removal by the apparatus 100) only at times the time space 206, 208 between consecutive data transmission units is less than a predetermined time corresponding to the bit time required to add the protocol information (and provide the minimum inter packet gap once the information is added).

Further, in one or more examples, the apparatus 100 may allow for implementation of MACsec alongside Time-Sensitive Networking, TSN, or Audio Video Bridging, AVB.

In the examples above, the protocol module 110 is a MACsec protocol module and the protocol information comprises MACsec based protocol information. However, in other examples, the protocol module 110 may be configured to add IEEE802.1CB header data comprising an IEEE 802.1CB EtherType and sequence number, such as specified in IEEE 802.1CB-2017—Frame Replication and Elimination for Reliability. In a still further example, the protocol module 110 may be configured to add the IEEE 1722 AVB Transport protocol information. In such an example, the protocol module 110 may be configured to add protocol information such as CAN, LIN or other data or designations.

In the examples described, the filter module 108, the protocol module 110, and the PHY module 102 are shown as discrete "blocks" but it will be appreciated that the blocks are provided to show the functions of the apparatus 100 and the physical layout of the apparatus may or may not include such a separation of functionality. For example, in one or more examples, physical components may be provided to perform one or more of the filtering and adding of the protocol information functions. However, in other examples, a processor (not shown) may be provided and one or more of the functions provided by the filter module and protocol module may be provided by software executed by the processor. In other examples the apparatus 100 may be embodied as a combination of software executed by one or more processors and appropriately configured hardware.

Figure 3:
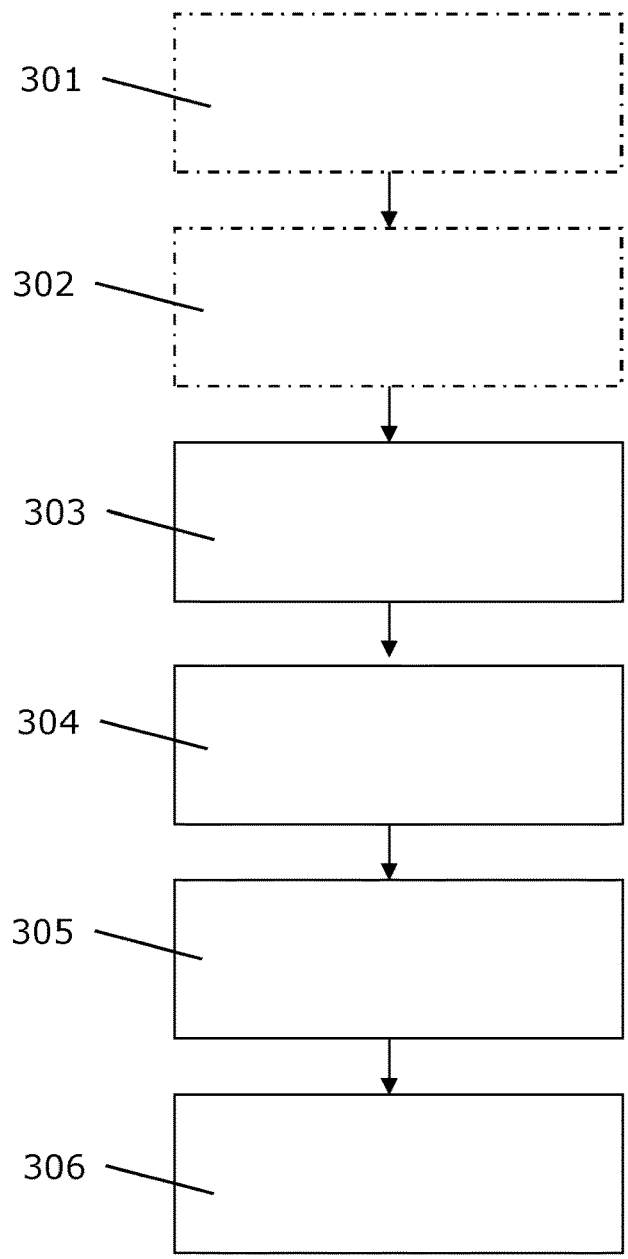
FIG. 3 shows a flow chart illustrating an example method.
Figure 4:
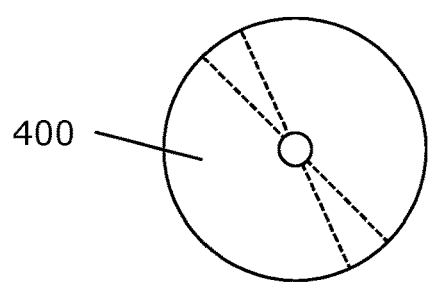
FIG. 4 shows an example computer readable medium comprising computer program code for implementing the method of FIG. 3.

FIG. 3 shows an example method comprising:
receiving 303, by an apparatus, a stream of data transmission units;
identifying 304 in the stream, by a filter, at least one data transmission unit of a first predetermined type based on predefined identifying information and generating a second stream of data transmission units comprising said first stream with at least one data transmission unit filtered out, the at least one data transmission unit that is filtered out comprising one of: the identified data transmission unit of the first predetermined type; and at least one data transmission unit that is received subsequent to the data transmission unit of the first predetermined type;
receiving 305, at a protocol module, said second stream and identifying, in the second stream, at least one data transmission unit of a second predetermined type and adding protocol information to the at least one data transmission unit of the second predetermined type, the protocol module configured to identify the at least one data transmission unit of the second predetermined type based on second predefined identifying information; and
wherein the filtering out of said at least one data transmission unit is configured to provide time in said second stream for the adding of the protocol information prior to a start of a subsequent data transmission unit in said second stream; and
transmitting 306 signals representative of said data transmission units of the second stream with said protocol information added over a transmission medium.

The method may include, prior to said receiving step 303:
generating 301, by a processor, a plurality of said data transmission units for the stream, wherein for each of the data transmission units of the second predetermined type, the method comprises generating at least one data transmission unit of the first predetermined type to directly follow said data transmission units of the second predetermined type for filtering out by the filter;
providing 302, by said processor, said plurality of said data transmission units to a media access controller that provides the stream of data transmission units to the apparatus.

Example FIG. 5 shows a computer readable medium 500 which includes computer program code for implementing steps 401 and 402 at the processor 104. In other examples, the computer program code may be configured to provide for steps 403 to 406 at the apparatus 100.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
an input for receiving a stream of data transmission units;
a filter configured to:
identify, in the stream of data transmission units, a first data transmission unit of a first predetermined type based on predefined identifying information; and
generate a second stream of data transmission units by removing the first data transmission unit from the first stream of data transmission units;
a protocol module configured to:
receive the second stream of data transmission units;
identify, in the second stream of data transmission units, a second data transmission unit of a second predetermined type based on second predefined identifying information; and
add protocol information to the second data transmission unit of the second predetermined type, wherein the filter is further configured provide time in the second stream of data transmission units for the addition of the protocol information prior to a start of a subsequent data transmission unit in the second stream of data transmission units, wherein the filter is configured to remove the first data transmission unit at a time when the space between the second data transmission unit of the second predetermined type and the subsequent data transmission unit is less than that required to add the protocol information; and
a transceiver configured to output signals to a transmission medium, the signals representative of the second stream of data transmission units, including the added protocol information.

2. The apparatus of claim 1, wherein the filter is configured to identify, in the first stream of data transmission units, the first data transmission unit of the first predetermined type based on an address stated in the first data transmission unit matching a predetermined addresses in the predefined identifying information.

3. The apparatus of claim 2, wherein the predetermined address comprises a destination media access control, MAC, address.

4. The apparatus of claim 1, wherein the filter is configured to identify, in the first stream of data transmission units, the first data transmission unit of the first predetermined type based on one or more of:
a destination address;
a source address;
an EtherType field;
a Virtual Local Area Network, VLAN, identifier;
a preamble pattern; or
a filtering rule.

5. The apparatus of claim 1, wherein the size of the first data transmission unit of the first predetermined type is at least the size of the protocol information added to the second data transmission unit by the protocol module.

6. The apparatus of claim 1, wherein the protocol module comprises a security protocol module and the protocol information added to the second data transmission unit of the second predetermined type comprises security protocol information.

7. The apparatus of claim 1, wherein the protocol module is configured to implement, at least in part, the MACSec security protocol, and wherein the security protocol information includes at least one of a MACSec header and Integrity Check Value.

8. The apparatus of claim 1, wherein time gaps between data transmission units of the first stream of data transmission units are each less than an amount of time required to add the protocol information at a data rate used to encode the data transmission units.

9. The apparatus of claim 1, wherein the apparatus is configured to receive the first stream of data transmission units at a predetermined line rate and the transceiver is configured to transmit the signals at the predetermined line rate.

10. The apparatus of claim 1 wherein the protocol information comprises IEEE802.1CB header data comprising an IEEE 802.1CB EtherType and sequence number.

11. The apparatus of claim 1 wherein the protocol information comprises IEEE 1722 AVB Transport protocol information.

12. The apparatus of claim 1 in combination with a processor, wherein:
the processor is configured to:
generate data transmission units for the first stream of data transmission units;
generate, for each of the data transmission units having the second predetermined type, at least one data transmission unit of the first predetermined type directly following that data transmission unit of the second predetermined type; and
wherein the processor is configured to provide the data transmission units to a media access controller for adding information to the data transmission units before providing the stream of data transmission units for the apparatus.

13. The apparatus of claim 12, wherein the media access controller is configured to receive the data transmission units from the processor and to provide to the data transmission units at least one of: a preamble, a start-of-frame delimiter, a frame check sequence, or a predetermined time-space between the data transmission units.

14. The apparatus of claim 1, wherein the first predetermined type is the same as the second predetermined type and wherein the second stream of data transmission units comprises the first stream of data transmission units with one or more data transmission units that appear in the stream directly after the first data transmission unit of the first predetermined type filtered out.

15. An integrated circuit comprising the apparatus of claim 1, wherein the integrated circuit comprises the transceiver, a media access controller that provides the first stream of data transmission units to the apparatus, and a processor configured to control the media access controller.

16. An apparatus comprising:
an input for receiving a stream of data transmission units;
a filter configured to:
identify, in the stream of data transmission units, a first data transmission unit of a first predetermined type based on predefined identifying information; and
generate a second stream of data transmission units by removing the first data transmission unit from the first stream of data transmission units;
a protocol module configured to:

receive the second stream of data transmission units;
identify, in the second stream of data transmission units, a second data transmission unit of a second predetermined type based on second predefined identifying information; and
add protocol information to the second data transmission unit of the second predetermined type, wherein the filter is further configured provide time in the second stream of data transmission units for the addition of the protocol information prior to a start of a subsequent data transmission unit in the second stream of data transmission units; and
a transceiver configured to output signals to a transmission medium, the signals representative of the second stream of data transmission units, including the added protocol information, wherein the apparatus is configured to receive the first stream of data transmission units at a predetermined line rate and the transceiver is configured to transmit the signals at the predetermined line rate.

17. An apparatus comprising:
an input for receiving a stream of data transmission units;
a filter configured to:
identify, in the stream of data transmission units, a first data transmission unit of a first predetermined type based on predefined identifying information; and
generate a second stream of data transmission units by removing the first data transmission unit from the first stream of data transmission units;
a protocol module configured to:
receive the second stream of data transmission units;
identify, in the second stream of data transmission units, a second data transmission unit of a second predetermined type based on second predefined identifying information; and
add protocol information to the second data transmission unit of the second predetermined type, wherein the filter is further configured provide time in the second stream of data transmission units for the addition of the protocol information prior to a start of a subsequent data transmission unit in the second stream of data transmission units; and
a transceiver configured to output signals to a transmission medium, the signals representative of the second stream of data transmission units, including the added protocol information, wherein the first predetermined type is the same as the second predetermined type and wherein the second stream of data transmission units comprises the first stream of data transmission units with one or more data transmission units that appear in the stream directly after the first data transmission unit of the first predetermined type filtered out.

* * * * *